United States Patent
Block et al.

(10) Patent No.: US 9,344,681 B2
(45) Date of Patent: *May 17, 2016

(54) SYSTEMS AND METHODS OF INCORPORATING LIVE STREAMING SOURCES INTO A VIDEO CONFERENCE

(71) Applicant: Jupiter Systems, Hayward, CA (US)

(72) Inventors: Frederick P. Block, Westminster, CO (US); Brady O. Bruce, San Francisco, CA (US); Stanislav Angelov, Pleasanton, CA (US)

(73) Assignee: InFocus Corporation, Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/465,534

(22) Filed: Aug. 21, 2014

(65) Prior Publication Data

US 2016/0057391 A1 Feb. 25, 2016

(51) Int. Cl.
*H04N 7/14* (2006.01)
*H04N 7/15* (2006.01)
*H04L 29/06* (2006.01)
*H04N 5/232* (2006.01)

(52) U.S. Cl.
CPC ............ *H04N 7/155* (2013.01); *H04L 65/4023* (2013.01); *H04N 5/232* (2013.01)

(58) Field of Classification Search
CPC .................................................... H04N 7/14
USPC ........... 348/14.01, 14.03, 14.04, 14.07, 14.08
See application file for complete search history.

(56) References Cited

U.S. PATENT DOCUMENTS

| | | | |
|---|---|---|---|
| 8,248,455 B2* | 8/2012 | Eisenberg | H04N 7/152 348/14.07 |
| 8,773,532 B2* | 7/2014 | Wengrovitz | H04N 7/181 348/143 |
| 2009/0249225 A1* | 10/2009 | Beswick | H04N 7/17309 715/756 |
| 2012/0287231 A1* | 11/2012 | Ravi | H04N 7/148 348/14.12 |
| 2013/0222523 A1* | 8/2013 | Shanmukhadas | H04N 19/40 348/14.08 |
| 2014/0210939 A1* | 7/2014 | Mock | H04L 65/605 348/14.03 |
| 2014/0253674 A1* | 9/2014 | Grondal | H04L 65/1083 348/14.08 |

* cited by examiner

*Primary Examiner* — Olisa Anwah
(74) *Attorney, Agent, or Firm* — Alleman Hall McCoy Russell & Tuttle LLP

(57) ABSTRACT

The technology disclosed solves the technical problem of incorporating live streaming sources into a video conference. In particular, the technology disclosed relates to pre-registering live streaming sources as pseudo-participants to optionally include in a video conference and causing the live streaming source represented by the pseudo-participant to be streamed to participants in the video conference without relay from one participant to another participant. The technology disclosed also relates to solving the technical problem of controlling a video conferencing interface during a video conference by allowing attendees of a video conference to configure a video interface template that includes areas to display participants and pseudo-participants live streaming sources.

20 Claims, 10 Drawing Sheets

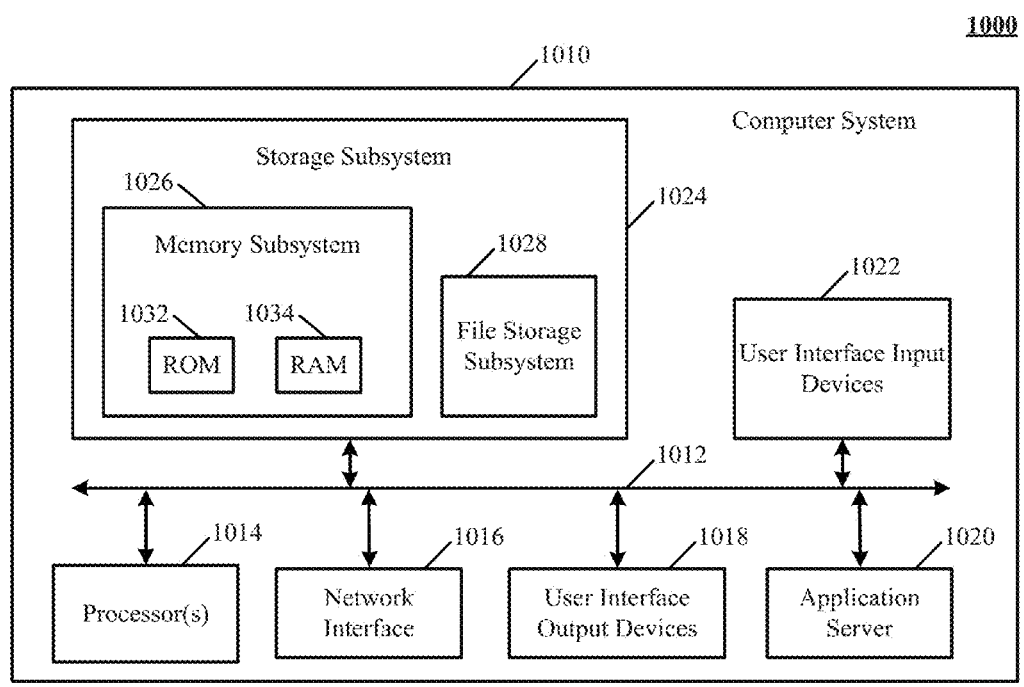
FIG. 10 – Computer System

SYSTEMS AND METHODS OF INCORPORATING LIVE STREAMING SOURCES INTO A VIDEO CONFERENCE

FIELD OF THE TECHNOLOGY DISCLOSED

The technology disclosed generally relates to video conferences, and in particular implementations, to facilitating streaming of live video feeds in video conferences.

RELATED APPLICATION

This application is related to U.S. patent application Ser. No. 14/457,004 entitled "SYSTEMS AND METHODS OF DISTRIBUTION OF LIVE STREAMING VIDEO FEEDS TO AND FROM VIDEO CALLERS DURING A VIDEO COLLABORATION SESSION," filed contemporaneously. The related application is incorporated by reference for all purposes.

INCORPORATION

Following material is incorporated by reference in this filing:
"CONCURRENT DECOMPRESSION OF MULTIPLE VIDEO STREAMS WITH CONSTRAINED DECOMPRESSION RESOURCES", U.S. Prov. application Ser. No. 13/828,619, filed 14 Mar. 2013.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Video conferencing provides an environment for users at different locations to discuss problems and work collaboratively. Many multi-national companies use video conferencing to provide low-cost face-to-face meetings between colleagues at remote locations. To enhance communications at those meetings, some video conferencing systems use computer generated images or presentations to be simultaneously broadcasted to participants either in a pop-up window or as an alternate switchable display on the video monitors.

Moreover, the mobile revolution has led to rampant use of mobile devices, such as smartphones and tablet computers, that include video cameras, which in turn has fueled wide adoption of video conferencing using the mobile devices. In the course of conducting a video conference using the mobile devices, the mobile devices transmit and receive video information from other parties in the video conference.

However, existing video conferencing systems are very restricted, with many mainstream multimedia sources and features yet to be introduced in the video conferencing realm. Therefore, an opportunity arises to incorporate live video streams from external video cameras into a video conference. Improved user experience and engagement and higher customer satisfaction and retention may result.

SUMMARY

The technology disclosed solves the technical problem of incorporating live streaming sources into a video conference. In particular, the technology disclosed relates to pre-registering live streaming sources as pseudo-participants to optionally include in a video conference and causing the live streaming source represented by the pseudo-participant to be streamed to participants in the video conference without relay from one participant to another participant. The technology disclosed also relates to solving the technical problem of controlling a video conferencing interface during a video conference by allowing attendees of a video conference to configure a video interface template that includes areas to display participants and pseudo-participants live streaming sources.

Other aspects and advantages of the technology disclosed can be seen on review of the drawings, the detailed description and the claims, which follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 10 is a block diagram of an example computer system to incorporate live streaming sources into a video conference.

DESCRIPTION

Introduction

Figure 1:
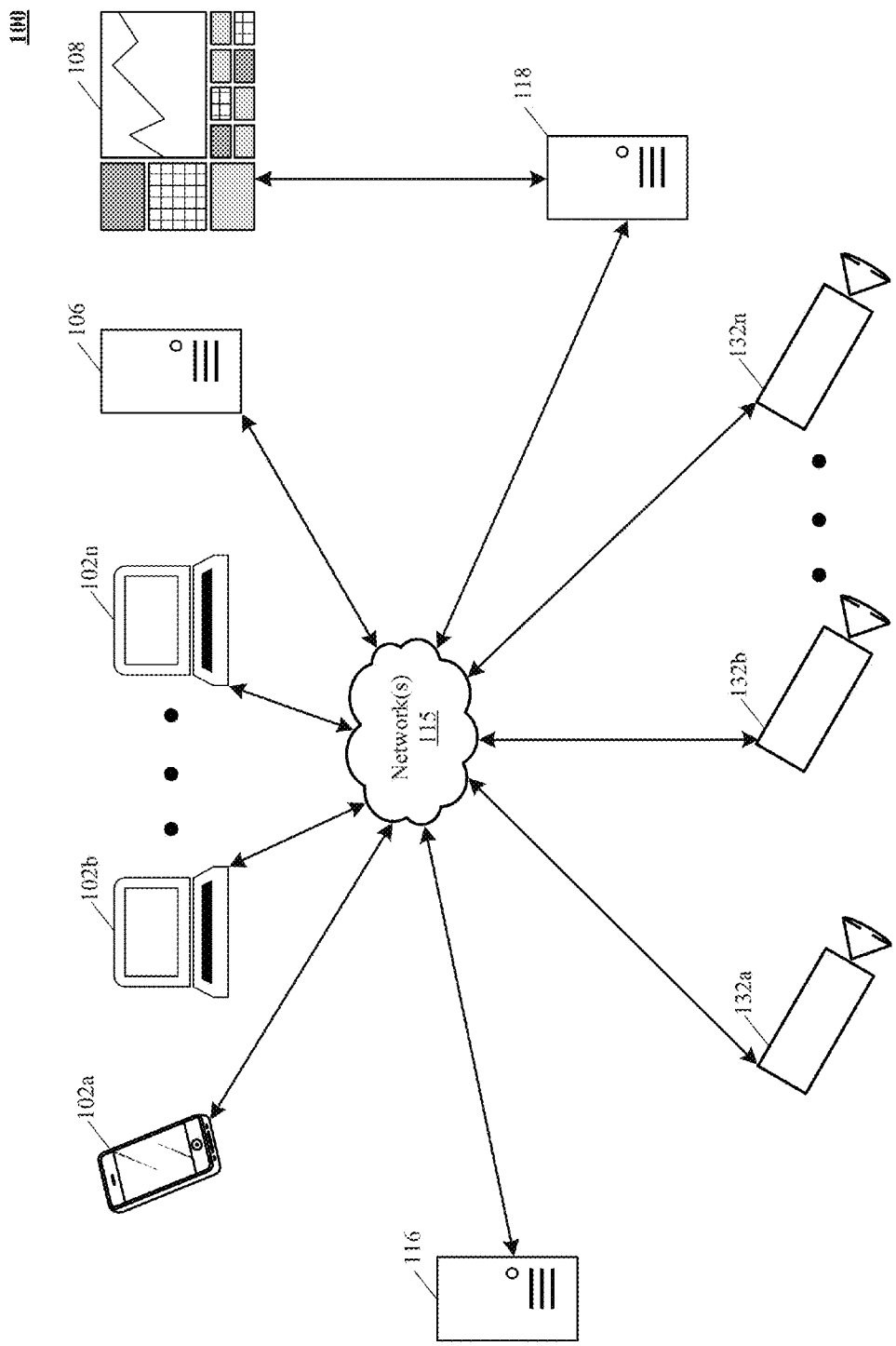
FIG. 1 illustrates an exemplary video conferencing environment.

Real-time video and web conferencing systems typically provide the ability for a presenter to share his desktop or a particular application with other attendees. This mechanism is usually used to share presentations or other relatively static information with conference attendees. However, for video information sharing, the frame rate and resolution available with this approach is generally unacceptable. Also, the ITU's H.239 standard provides a mechanism to include a single additional video channel with a conference that enables transmission of a graphics presentation or video from a document camera, thus being restricted to content from a single source.

In addition, Cisco's WebEx allows presenters to share files from their desktop, including video files. WebEx meeting can show a pre-recorded streaming video from a website like YouTube. Like the H.239 mechanism, this ability in WebEx allows only one pre-recorded video stream at a time to be added to a meeting and the source is limited to a file on the presenter's desktop or a streaming pre-recorded video from a website. Further, a mechanism to share a video file in a Microsoft Lync meeting includes embedding the video file in a PowerPoint presentation and sharing the PowerPoint during the meeting. This mechanism requires the video to be available as a file on the presenter's desktop, thus making it inoperable for live video streams. Therefore, none of these existing mechanisms solve the technical problem of simultaneously bringing live video feed from multiple external video sources into a video conference.

The technology disclosed solves the technical problem of incorporating live streaming sources into a video conference. In particular, the technology disclosed relates to pre-registering live streaming sources as pseudo-participants to optionally include in a video conference, selecting at least one pseudo-participant in the video conference, providing instructions that control at least positioning of the selected pseudo-participant among objects displayed in the video conference, and receiving stream from the live streaming source represented by the pseudo-participant without relay from one participant to another participant.

"Pseudo-participants" of a video conference refers to live streaming video sources that provide real-time monitoring of a region of interest, according to one implementation. In another implementation, "pseudo-participants" of a video conference refers to live streaming video sources that do not have participants of the video conference in their fields of view during the video conference. Some other implementations include the pseudo-participants of a video conference being information sources that broadcast unidirectional live video feeds to a video conference bridge, without receiving video feeds from any of the endpoints (other participants) of the conference bridge.

In addition, receiving video feed from the live streaming source without relay from one participant to another participant allows for transmission of high resolution of image data and greater image frame transfer rate, thus enhancing the quality of video feeds received from the pseudo-participant video sources. Also, multicasting directly from the pseudo-participants to other participants of a video conference reduces the bandwidth requirements and facilitates efficient delivery of live video feeds.

Further, the technology disclosed solves the technical problem of controlling a video conferencing interface during a video conference. Existing video conferencing systems provide minimal to no control of the video conferencing display, with only a selection of pre-defined views supported by (programmed into) the conferencing client. The rigid interface problem escalates when a video conference includes a substantial number of attendees and pseudo-participant live streaming sources.

The technology disclosed solves this problem by allowing the moderator of a video conference to configure a video interface template that includes areas to display participants and pseudo-participants live streaming sources. In addition, pseudo-participants are assigned to the area in the template for pseudo-participants, such that starting a conference with the configured template instructs a video conferencing system to automatically bring a live streaming source represented by the particular pseudo-participant into the video conference.

Also, the interface template includes scroll controls that allow manipulation of the areas included for displaying participants and pseudo-participants live streaming sources, accommodating a variable and potentially large number of such sources. The manipulation of the areas further includes at least updating assignment of participants and pseudo-participants live streaming sources to the areas of the interface template during the video conference, according to one implementation of the technology disclosed. The manipulation of the areas also includes modifying a position and size of the areas during the video conference.

The technology disclosed relates to incorporating live streaming sources into a video conference by using computer-implemented systems. The technology disclosed can be implemented in the context of any computer-implemented system including an on-demand database system, a multi-tenant environment, or the like. Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

The technology disclosed allows users to incorporate live streaming sources into a video conference. Examples of systems, apparatus, and methods according to the disclosed implementations are described in a "video conferencing" context. The examples of "video conferencing" are being provided solely to add context and aid in the understanding of the disclosed implementations. In other instances, examples of pseudo-participant incorporation in other contexts like video collaboration sessions, video calls, video chats, etc. may be used. Other applications are possible, such that the following examples should not be taken as definitive or limiting either in scope, context, or setting. It will thus be apparent to one skilled in the art that implementations may be practiced in or outside the "video conferencing" context.

As used herein, a given signal, event or value is "responsive to" a predecessor signal, event or value of the predecessor signal, event or value influenced by the given signal, event or value. If there is an intervening processing element, step or time period, the given signal, event or value can still be "responsive to" the predecessor signal, event or value. If the intervening processing element or step combines more than one signal, event or value, the signal output of the processing element or step is considered "responsive to" each of the signal, event or value inputs. If the given signal, event or value is the same as the predecessor signal, event or value, this is merely a degenerate case in which the given signal, event or value is still considered to be "responsive to" the predecessor signal, event or value. "Responsiveness" or "dependency" or "basis" of a given signal, event or value upon another signal, event or value is defined similarly.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

Video Conferencing Environment

FIG. 1 illustrates an exemplary video conferencing environment 100. FIG. 1 includes user computing devices 102a-n, security server 106, conference server 116, display wall processor 118, and display wall 108. FIG. 1 also shows network(s) 115, visual conferencing server 122, and cameras 132a-n. In other implementations, environment 100 may not have the same elements or components as those listed above and/or may have other/different elements or components instead of, or in addition to, those listed above, such as an on-demand database service, network interface, or application platform. The different elements or components can be combined into single software modules and multiple software modules can run on the same hardware.

Network(s) 115 is any network or combination of networks of devices that communicate with one another. For example, network(s) 115 can be any one or any combination of a LAN (local area network), WAN (wide area network), telephone network (Public Switched Telephone Network (PSTN), Session Initiation Protocol (SIP), 3G, 4G LTE), wireless network, point-to-point network, star network, token ring network, hub network, WiMAX, WiFi, peer-to-peer connections like Bluetooth, Near Field Communication (NFC), Z-Wave, ZigBee, or other appropriate configuration of data networks, including the Internet. In other implementations, other networks can be used such as an intranet, an extranet, a virtual private network (VPN), a non-TCP/IP based network, any LAN or WAN or the like.

Servers (106, 116, 118) can be of varying types including a workstation, server, computing cluster, blade server, server farm, or any other data processing system or computing device. In some implementations, each server (106, 116, 118) can be communicably coupled to user computing devices 102a-n and cameras 132a-n via a different network connection. For example, security server 106 can be coupled via the network(s) 115 (e.g., the Internet), conference server 116 can be coupled via a direct network link, and display wall processor 118 can be coupled by yet a different network connection.

User computing devices 102a-n can be desktop personal computers, laptop computers, tablet computers, smartphones, personal digital assistants (PDA), digital image capture devices, cell phones, or any wireless access protocol (WAP) enabled devices or any other computing devices capable of interfacing directly or indirectly to the Internet or other network connection. User computing devices 102a-n can run an HTTP client, e.g., a browsing program, such as Microsoft's Internet Explorer browser, Mozilla's Firefox browser, Opera's browser, Google's Chrome, or a WAP-enabled browser in the case of a cell phone, PDA or other wireless device, or the like, allowing a participant of a video conference to access, process and view information, pages and applications available to it from environment 100 over network(s) 115.

User computing devices 102a-n also include one or more user interface devices, such as a keyboard, a mouse, trackball, touch pad, touch screen, pen or the like, for interacting with a video conference interface in conjunction with pages, forms, applications and other information provided by environment 100 or other systems or servers. For example, the user interface device can be used to schedule conferences, perform selections, access data and applications hosted by environment 100, and to perform searches on stored data, and otherwise allow a video conference participant to interact with various video interface pages.

When conducting a video conference, cameras 132a-n can serve as pseudo-participants of the video conference such that live video feed (i.e. both audio and image information) from the cameras 132a-n can be used as the image or video source for the video conference. In some implementations, cameras 132a-n can be any type of cameras, including cameras sensitive across the visible spectrum or, more typically, with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. For instance, cameras 132a-n can be surveillance cameras or private cameras mounted on a structure, such as a building or utility pole. In another example, cameras 132a-n can be embedded in user computing devices 102a-n described above or can be peripheral devices capable of streaming video.

In some implementations, user computing devices 102a-n and cameras 132a-n can communicate with the different servers and processors (106, 116, 118) using TCP/IP (Transfer Control Protocol and Internet Protocol) network and, at a higher network level, use other common Internet protocols to communicate, such as HTTP, FTP, AFS, WAP, etc.

In an example where HTTP is used, devices 102a-n and cameras 132a-n can include an HTTP client for sending and receiving HTTP messages to and from an HTTP server in environment 100. Such an HTTP server can be implemented as the sole network interface between the different servers and processors and network(s) 115, but other techniques can be used as well or instead. In some implementations, the interface between the different servers and processors and network(s) 115 includes load sharing functionality, such as round-robin HTTP request distributors to balance loads and distribute incoming HTTP requests evenly over a plurality of servers.

Conference server 116 acts as an intermediary between the user computing devices 102a-n and cameras 132a-n during video conferences. In some implementations, conference server 116 collects audio and/or video signals transmitted by participants and pseudo-participants of a video conference and distributes such signals to other remote participants of the video conference, and vice-versa. In other implementations, conference server 116 can assign audio and/or video signals from a participant and pseudo-participant of the video conference to a particular remote participant, and vice-versa. In other implementations, the video conferencing environment 100 may not include a central server such as conference server 116 and employ a peer-to-peer (P2P) architecture for multi-point video conferencing.

Environment 100 also implements a display wall 108, controlled by a display wall processor 118 such as Jupiter Systems' Fusion Catalyst. Display wall 108 advances end-to-end conferencing between participants of a video conference such that remote participants can share streams from pseudo-participants (cameras 132a-n) broadcasted on the display wall 108, both as sources and as destinations.

In one implementation, packet-switching technology can be used to show any information source on the display wall 108, such as a single window spanning multiple screens in the display wall 108 or as separate windows individually presented across different screens in the display wall 108. In one implementation, display wall processor 118 supports client software applications as well as provides related data, code, forms, webpages and other information to and from user computing devices 102a-n and cameras 132a-n.

Security server 106 ensures minimum security risk during the video conferencing conducted by the video conferencing environment 100. In one implementation, security server 106 executes a Network Authentication Process (NAP) that gathers user credentials such as usernames and passwords from all participants of a video conference and forwards them to an LDAP (Lightweight Directory Access Protocol) server, requesting additional authentication values such as realm, domain, or context for the participants. Once the access information is extracted from the LDAP module, it is parsed by the NAP to identify specific values needed. The parsed value is then used when passing the participant credential's to an authentication module, which either grants or rejects participation of the participants in the video conference.

Some implementations include the authentication module allowing participants restricted access to the video conference by authorizing viewing of live streams from only a subset of pseudo-participants of the video conference. In such an implementation, live stream windows from restricted pseudo-participants of the video conference are blanked out for the unauthorized participants of the video conference.

Pseudo-Participants

According to one implementation, a list of pseudo-participants can be stored in memory that describes the pseudo-participants that are available for possible use as live streaming sources in a video conference. In some implementations, description about the pseudo-participants can include a camera identifier, camera location (site name, street address, latitude, longitude), camera SIP address, or display screen identifier.

In another implementation, a participant of a video conference can search for available pseudo-participants from a database of pseudo-participants. In one implementation, the pseudo-participants are specified in a LDAP directory or an Active Directory server. In another implementation, an SQL server can be employed to query an on-demand database service (ODDS) that identifies the available pseudo-participants. In response, a list or menu of available pseudo-participants can then be displayed or otherwise presented to the participant who initiated the search. This list can be further used by a moderator of the video conference for pre-registering one or more pseudo-participants to broadcast live video feeds to other participants of the video conference during the video conference.

Some implementations include distinguishing between pseudo-participant live streaming sources and participant live stream sources based on the address format of the invitees. For instance, Real-Time Streaming Protocol (RTSP) URLs can be assigned to pseudo-participant live streaming sources to differentiate them from participant live stream sources which might be specified using SIP URLs. In other implementations SIP URLs are used for all invitees and pseudo-participants are identified by specific SIP URL text patterns. In one implementation, pseudo-participants, upon identification, are automatically and immediately incorporated in a video conference without authentication evaluation required for the participants in some implementations.

Figure 2:
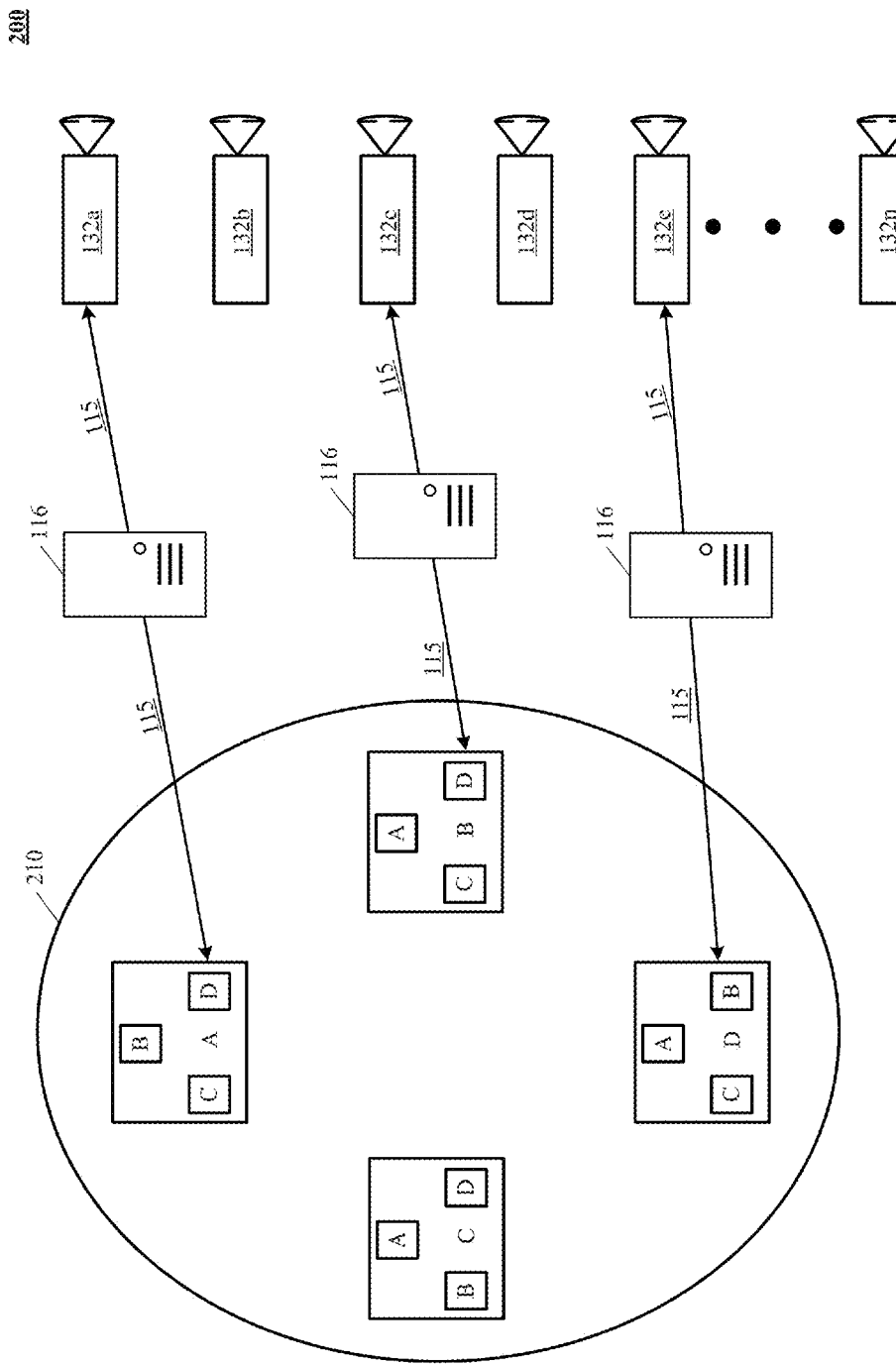
FIG. 2 shows one implementation of pseudo-participants of a video conference broadcasting live video feed to other participants of the video conference during the video conference.

FIG. 2 shows one implementation of pseudo-participants 132a-n of a video conference 200 broadcasting live video feed to other participants 210 of the video conference 200 during the video conference 200. During the course of the video conference 200, live video feed from the pseudo-participants 132a-n can be transmitted over network(s) 115 to other participants via conference server 116. In another implementation, live video feed from selected cameras can be broadcasted to specific participants in the video conference 200

Pseudo-participant live streaming sources can also be added during an ongoing video conference. In one implementation, a conference moderator can add a pseudo-participant source by entering an address such as an RTSP or SIP URL corresponding to the pseudo-participant source to be added to the video conference. For example, an IP camera can have an address like "sip:ipcamera3@host.domain" or "rtsp://host-.domain/axis-media/media.amp?Transport=multicast."

When adding such a source, other participants in the video conference can see this new video source as if a new participant has joined i.e. the conferencing system adds the new source to the participant roster and the video/audio streams from this source are made available to existing conference participants. According to another implementation, a particular pseudo-participant live streaming source can be added to an ongoing video conference when the conference moderator selects a different video interface template for the conference, which includes the particular pseudo-participant live video source.

In some implementations, once added, pseudo-participant live streaming sources appear to other participants as participants in the video conference and operations normally associated with participants are made available for the pseudo-participants as well. For example, the pseudo-participants appear in the conference roster, the moderator can forcibly drop them from the conference, the moderator can "mute" or "unmute" the video/audio coming from these sources, etc. Certain operations do not apply to pseudo-participant sources and could be prohibited in some implementations, for example initiating an in-conference text message. To make it clear why certain operations may not apply, some implementations the conferencing system can identify pseudo-participant sources in a visually distinct manner in the roster (for example using a distinctive icon). Another implementation can include allowing all operations to be attempted and those that typically would generate a response can be ignored.

FIG. 2 shows one example of a video conference 200 that includes participants A, B, C, and D receiving live streaming video from one or more pseudo-participants 132a-n. As shown in FIG. 2, participant A views video stream from other participants B, C, and D and also receives live stream from the pseudo-participant 132a over the network 115 via conference server 116. Similarly, participants B and D respectively receive live streams from pseudo-participants 132c and 132e while they communicate with other participants of the video conference 200.

Figure 3:
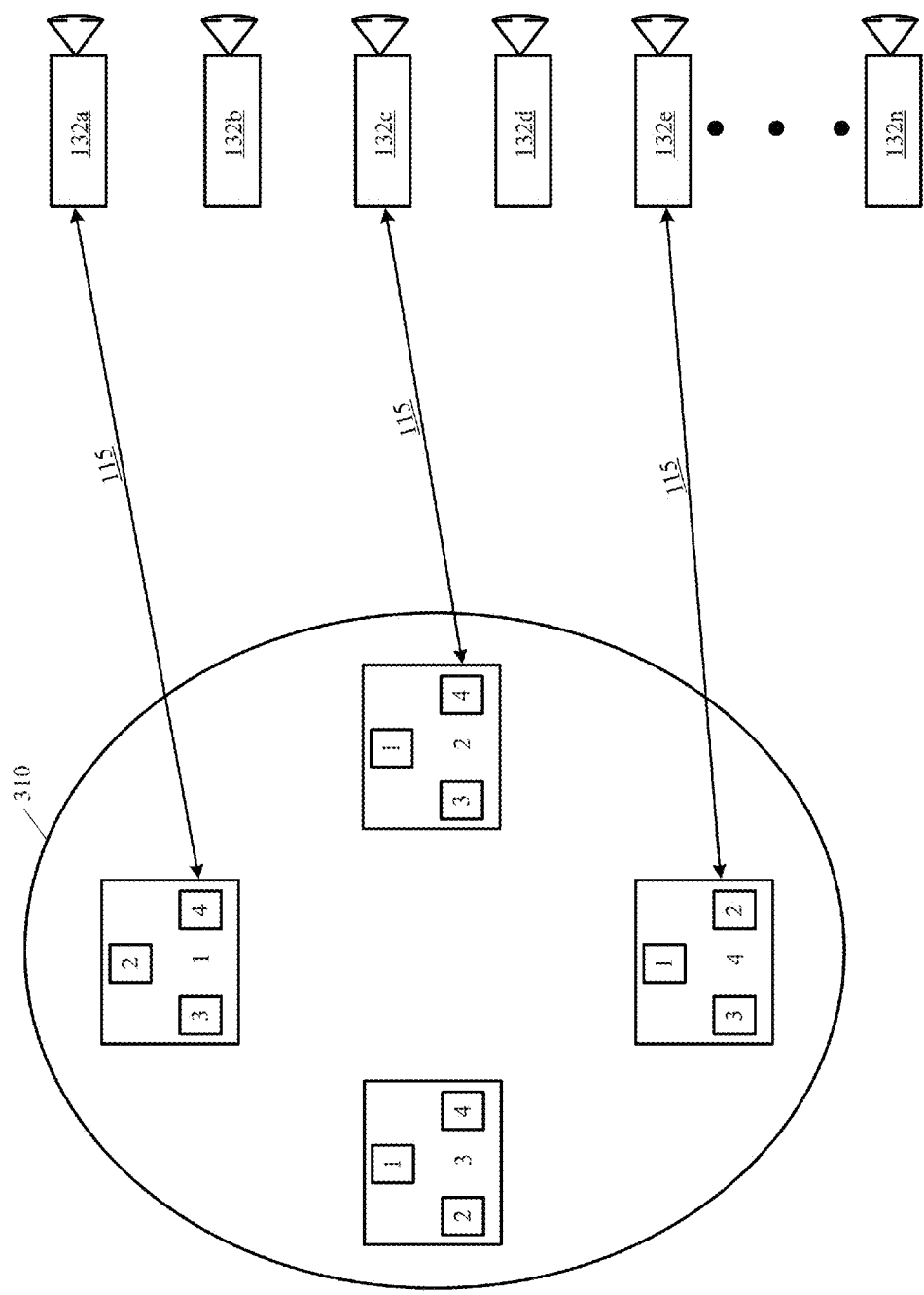
FIG. 3 is one implementation of pseudo-participants of a video conference multicasting live video feed to other participants of the video conference during the video conference.

FIG. 3 is one implementation of pseudo-participants 132a-n of a video conference 300 multicasting live video feed to other participants 310 of the video conference 300 during the video conference 300. In one implementation, live video feed, from cameras 132a-n, can be directly broadcasted to one or more participants of a video conference 300. In one implementation, registration messages can be sent by a video conference moderator's device via a unicast transmission or multicast stream to the one or more pseudo-participants 132a-n of the video conference 300. The unicast transmission or multicast stream can be made across the network 115 according to a network multicasting protocol such as Internet Group Management Protocol (IGMP) or Protocol Independent Multicast (PIM) or according to the destination addresses. The registration messages request set up of a video conference bridge between the pseudo-participants 132a-n and other participants 310 of the video conference 300. In one implementation, the registration messages can include identification (ID) of the video conference 300 and/or Internet Protocol (IP) addresses of the devices of the other participants 310.

For example, in FIG. 3, participant A views video stream from other participants B, C, and D and also receives live stream from the pseudo-participant 132*a* peercasted to participant A's device, without any intermediary conference server. Similarly, participants B and D respectively receive live streams being peercasted to them from pseudo-participants 132*c* and 132*e* while they communicate with other participants of the video conference 300.

Thus, multicasting, unicasting, or peercasting obviates the need of a centralized video conferencing server to include pseudo-participants 132*a-n* in video conference 300. Also, multicasting reduces the bandwidth requirements and facilitates efficient delivery of live video feeds to the destination participants of the video conference 300 because the video information is transmitted over each link in the network 115 only once. Once the video information is received by a conference endpoint, it is replicated for distribution among multiple conference endpoints, thus causing reduction in latency for video information transmission.

Figure 4:
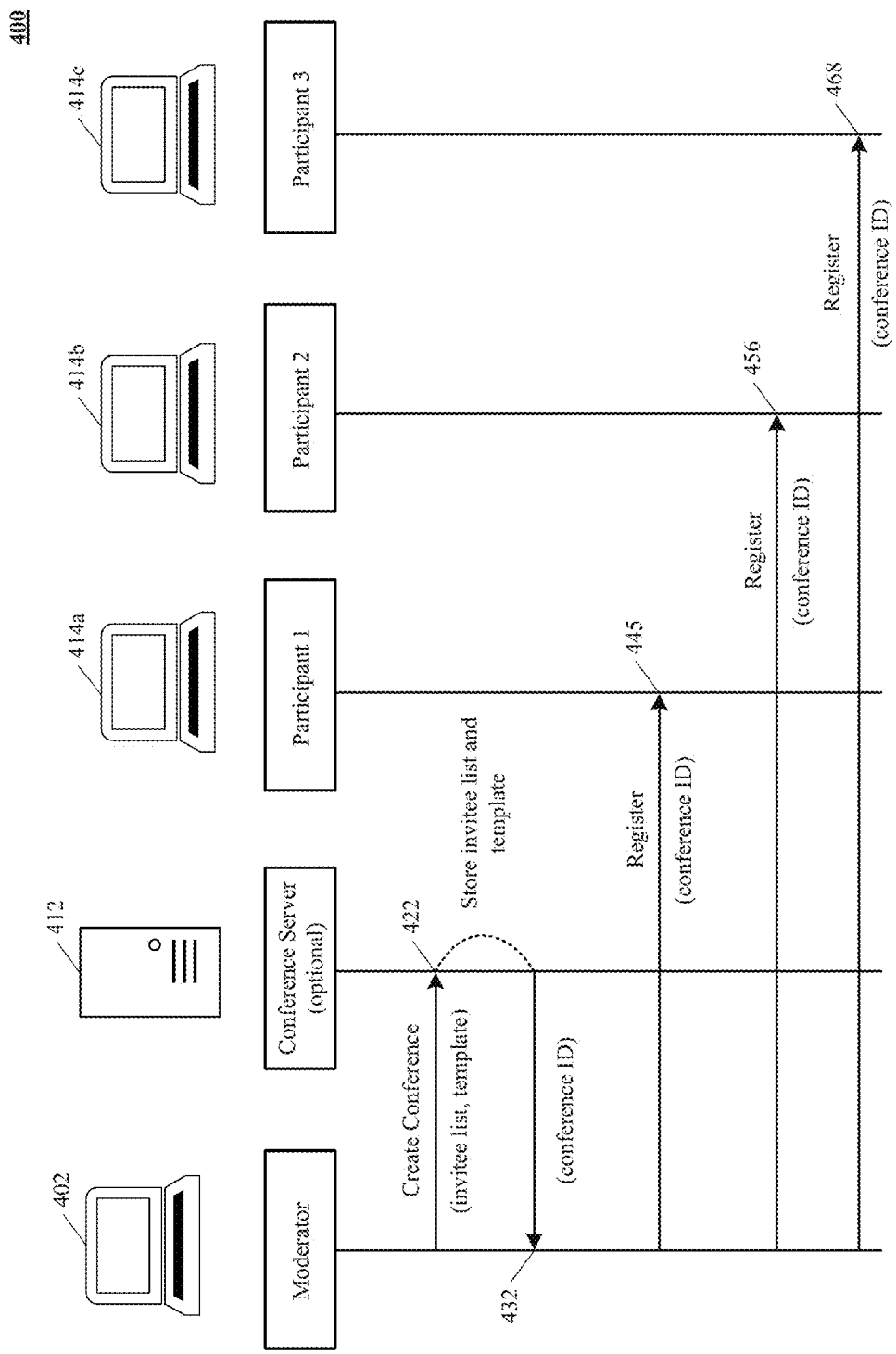
FIG. 4 depicts one implementation of a message sequence chart of scheduling a video conference including pseudo-participants.

FIG. 4 depicts one implementation of a message sequence chart 400 of scheduling a video conference including pseudo-participants. Other implementations may perform the exchanges in different orders and/or with different, fewer or additional exchanges than the ones illustrated in FIG. 4. Multiple exchanges can be combined in some implementations. For convenience, this chart is described with reference to the system that carries out a method. The system is not necessarily part of the chart.

At exchange 422, a moderator 402 of a video conference provisions the video conference with a conference server 412 and specifies to the conference server 412 an invitee or attendee list and/or template of video source deliveries from one or more pseudo-participants to respective devices of the attendees. In response, the conference server 412 generates conference identification (ID) and sends it to a device 402 of the moderator at exchange 432. At exchanges 445, 456, and 468, the moderator registers a plurality of participants 415*a-c* for live streaming during the provisioned video conference by sending a registration request to the respective participants 415*a-c*. In some implementations, the registration request is accompanied by the conference ID of the video conference. In other implementations, the registration request also specifies at least one of a time of broadcasting, participants authorized to view the broadcast, and quality (resolution, frames per second) of the broadcast.

Figure 5:
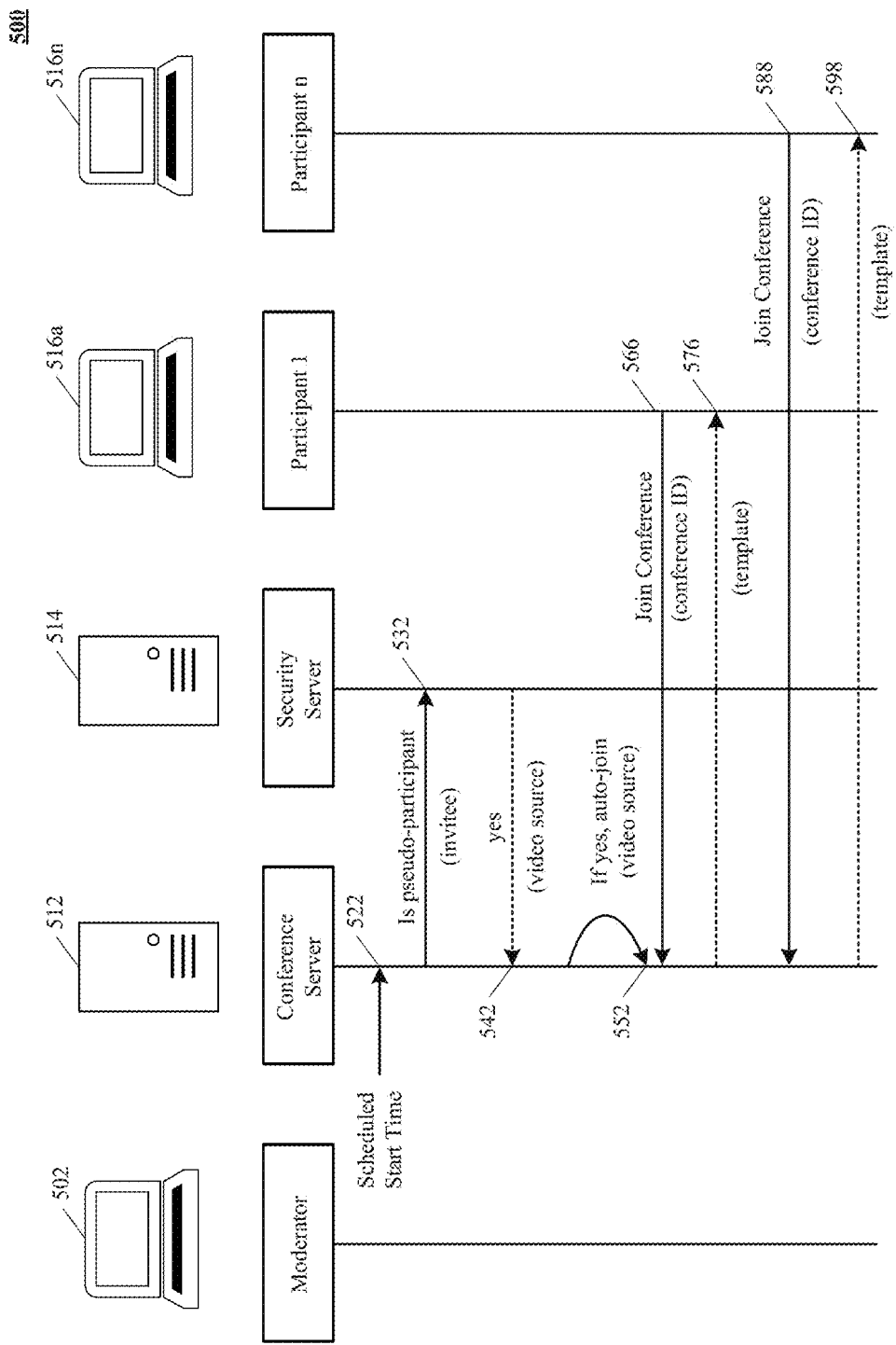
FIG. 5 illustrates one implementation of a message sequence chart of incorporating pseudo-participants in a video conference.

FIG. 5 illustrates one implementation of a message sequence chart 500 of incorporating pseudo-participants in a video conference. Other implementations may perform the exchanges in different orders and/or with different, fewer or additional exchanges than the ones illustrated in FIG. 5. Multiple exchanges can be combined in some implementations. For convenience, this chart is described with reference to the system that carries out a method. The system is not necessarily part of the chart.

At exchange 522, a timer set by the conference server 512 goes off at a starting time of the video conference. At exchange 532, the conference server 512 queries the security server 514 to identify any pseudo-participants of the video conference (from a list of invitees stored when the conference was scheduled, as shown in FIG. 4). Once identified at exchange 542, live video feeds from the pseudo-participants are automatically streamed into the video conference at exchange 552. Further, participant 516*a* and remote participant 516*n* of the video conference request entry into the conference bridge of the video conference at exchanges 566 and 588 (via conference server 512) using conference identification (ID) of the video conference.

After authentication by the security server 514, the conference server 512 sends a template of video source deliveries from one or more pseudo-participants to respective devices of the participant 516*a* and remote participant 515*n* at exchanges 576 and 598. In one implementation, the video streams are received by the conference server 512 prior to initiation of the video conference. When the conference starts and the participant 516*a* and remote participant 516*n* join the video conference, the video streams are then relayed to the participant 516*a* and remote participant 516*n* by the conference server 512. In another implementation, the IP addresses of the pseudo-participants are sent to the newly joining participants and fetched (unicasted or multicasted) directly by the participants, without being relayed through the conference server 512. In either case, participants are only allowed access to streams from pseudo participants under control of the security server 514.

Figure 6:
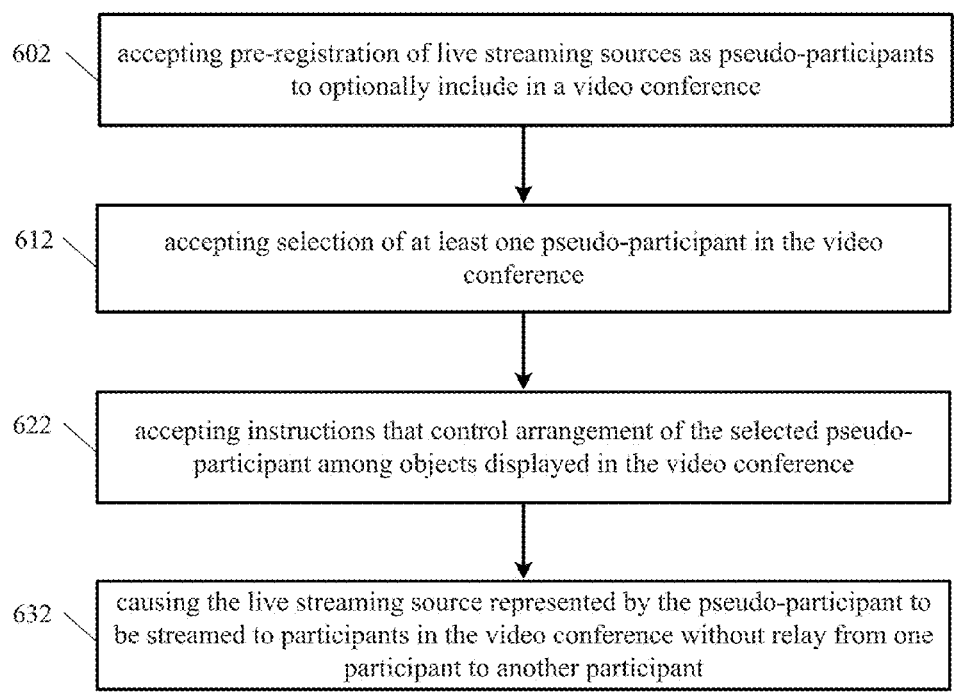
FIG. 6 is a flowchart showing a method of incorporating live streaming sources into a video conference from the perspective of a server.

FIG. 6 is a flowchart 600 showing a method of incorporating live streaming sources into a video conference from the perspective of a server. Flowchart 600 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 6. Multiple actions can be combined in some implementations. For convenience, this flowchart is described with reference to the system that carries out a method. The system is not necessarily part of the method.

At action 602, pre-registration is accepted by a server of live streaming sources as pseudo-participants to optionally include in a video conference. In one implementation, the pre-registration is accepted in response to at least speaking in a microphone, blinking of eye across an eye tracking device, moving a body part across a motion sensor, pressing a button on a device, selecting a screen object on an interface, or entering data across an interface. Examples of pseudo-participants include at least one of Internet Protocol (IP) cameras, desktop images, inputs from one or more mobile devices, and web windows.

At action 612, selection of at least one pseudo-participant in the video conference is accepted. In one implementation, a menu is provided of the registered pseudo-participants that can be included in the video conference for selection by participants or remote participants of the video conference.

At action 622, instructions are accepted that control arrangement of the selected pseudo-participant among objects displayed in the video conference. In one implementation, accepting instructions that control arrangement of the selected pseudo-participant includes specifying a position of a stream window of the selected pseudo-participant in the video conference. In another implementation, accepting instructions that control arrangement of the selected pseudo-participant includes specifying a size of a stream window of the selected pseudo-participant in the video conference.

In some implementations, a video conference template provides a set of scroll controls that allow for manipulation of stream windows of the participants and pseudo-participants live streaming sources during the video conference. In one implementation, the scroll controls are used to horizontally move the stream windows of the participants and pseudo-participants live streaming sources within a display or interface generated to coordinate the video conference. In another implementation, the scroll controls are used to vertically move the stream windows of the participants and pseudo-participants live streaming sources within a display or interface generated to coordinate the video conference.

Some implementations include modification of the video conference template during the course of the video conference. In such an implementation, the template can be modified by adding or removing the participants and pseudo-participants during the video conference using drag and drop functions. In one implementation, multiple views can be created for a particular video conference template such that a moderator can switch from an initial view that includes a first set of participants and pseudo-participants live streaming sources to a subsequent view that includes a second set of participants and pseudo-participants live streaming sources.

In a further implementation, participants of a video conference can be assigned viewership privileges regarding which live streaming sources, templates, or views within the templates they are authorized to view during a video conference such that initiating a particular template and/or view automatically triggers streaming of the included live streaming sources to the corresponding pre-designated participants. In a yet another implementation, the video conference template and view can be stored in an on-demand database service for use in future video conferences.

At action 632, the live streaming source represented by the pseudo-participant is streamed to participants in the video conference without relay from one participant to another participant. In one implementation, streaming without relaying includes downloading video feed from the pseudo-participant as individual packets and replicating the packets on the destination end for distribution among other participants and remote participants of the video conference.

Some other implementations include providing object-level security for a displayable sources incorporated in the video conference by maintaining at least one permissions list of the displayable source that identifies at least one of users, roles, and machines authorized to view streams from the displayable source and checking responsiveness of an attendees list of the video conference against the permissions list. In one implementation, when the video conference includes simultaneously streaming of a plurality of displayable sources, streams of some displayable sources that an attendee is not authorized to view are blanked out, without blanking out streams of other displayable sources that the attendee is authorized to view.

This method and other implementations of the technology disclosed can include one or more of the following features and/or features described in connection with additional methods disclosed. Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Figure 7:
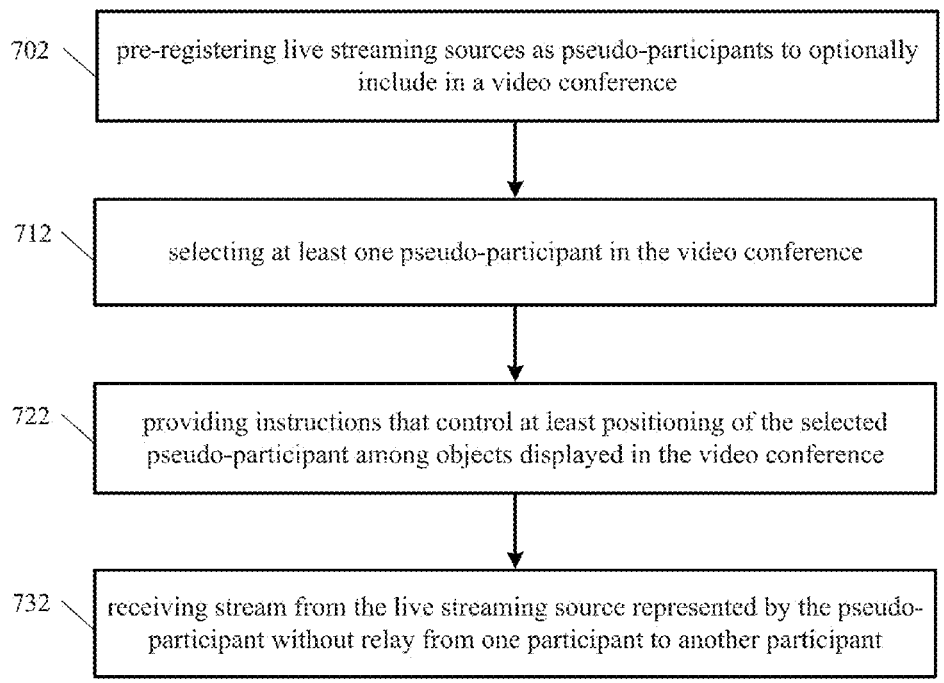
FIG. 7 illustrates one implementation of a method of incorporating live streaming sources into a video conference from the perspective of a client.

FIG. 7 illustrates one implementation of a method 700 of incorporating live streaming sources into a video conference from the perspective of a client. Flowchart 700 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 7. Multiple actions can be combined in some implementations.

For convenience, this flowchart is described with reference to the system that carries out a method. The system is not necessarily part of the method.

At action 702, live streaming sources are pre-registered by a client as pseudo-participants to optionally include in a video conference. In one implementation, the live streaming sources are pre-registered by at least speaking in a microphone, blinking of eye across an eye tracking device, moving a body part across a motion sensor, pressing a button on a device, selecting a screen object on an interface, or entering data across an interface. Examples of pseudo-participants include at least one of Internet Protocol (IP) cameras, desktop images, inputs from one or more mobile devices, and web windows.

At action 712, at least one pseudo-participant in the video conference is selected. In one implementation, a menu is provided of the registered pseudo-participants that can be included in the video conference for selection by participants or remote participants of the video conference.

At action 722, instructions are provided that control arrangement of the selected pseudo-participant among objects displayed in the video conference. In one implementation, providing instructions that control arrangement of the selected pseudo-participant includes specifying a position of a stream window of the selected pseudo-participant in the video conference. In another implementation, providing instructions that control arrangement of the selected pseudo-participant includes specifying a size of a stream window of the selected pseudo-participant in the video conference.

In some implementations, a video conference template provides a set of scroll controls that allow for manipulation of stream windows of the participants and pseudo-participants live streaming sources during the video conference. In one implementation, the scroll controls are used to horizontally move the stream windows of the participants and pseudo-participants live streaming sources within a display or interface generated to coordinate the video conference. In another implementation, the scroll controls are used to vertically move the stream windows of the participants and pseudo-participants live streaming sources within a display or interface generated to coordinate the video conference.

Some implementations include modification of the video conference template during the course of the video conference. In such an implementation, the template can be modified by adding or removing the participants and pseudo-participants during the video conference using drag and drop functions. In one implementation, multiple views can be created for a particular video conference template such that a moderator can switch from an initial view that includes a first set of participants and pseudo-participants live streaming sources to a subsequent view that includes a second set of participants and pseudo-participants live streaming sources.

In a further implementation, participants of a video conference can assigned viewership privileges regarding which live streaming sources, templates, or views within the templates they are authorized to view during a video conference such that initiating a particular template and/or view automatically triggers streaming of the included live streaming sources to the corresponding pre-designated participants. In a yet another implementation, the video conference template and view can be named and stored in an on-demand database service for use in future video conferences.

At action 732, the live streaming source represented by the pseudo-participant is streamed to participants in the video conference without relay from one participant to another participant. In one implementation, streaming without relaying includes downloading video feed from the pseudo-participant as individual packets and replicating the packets on the destination end for distribution among other participants and remote participants of the video conference.

Some other implementations include providing object-level security for a displayable sources incorporated in the video conference by maintaining at least one permissions list of the displayable source that identifies at least one of users, roles, and machines authorized to view streams from the displayable source and checking responsiveness of an attendees list of the video conference against the permissions list. In one implementation, when the video conference includes simultaneously streaming of a plurality of displayable sources, streams of some displayable sources that an attendee is not authorized to view are blanked out, without blanking out streams of other displayable sources that the attendee is authorized to view.

This method and other implementations of the technology disclosed can include one or more of the following features and/or features described in connection with additional methods disclosed. Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Video Interface Template

Figure 8:
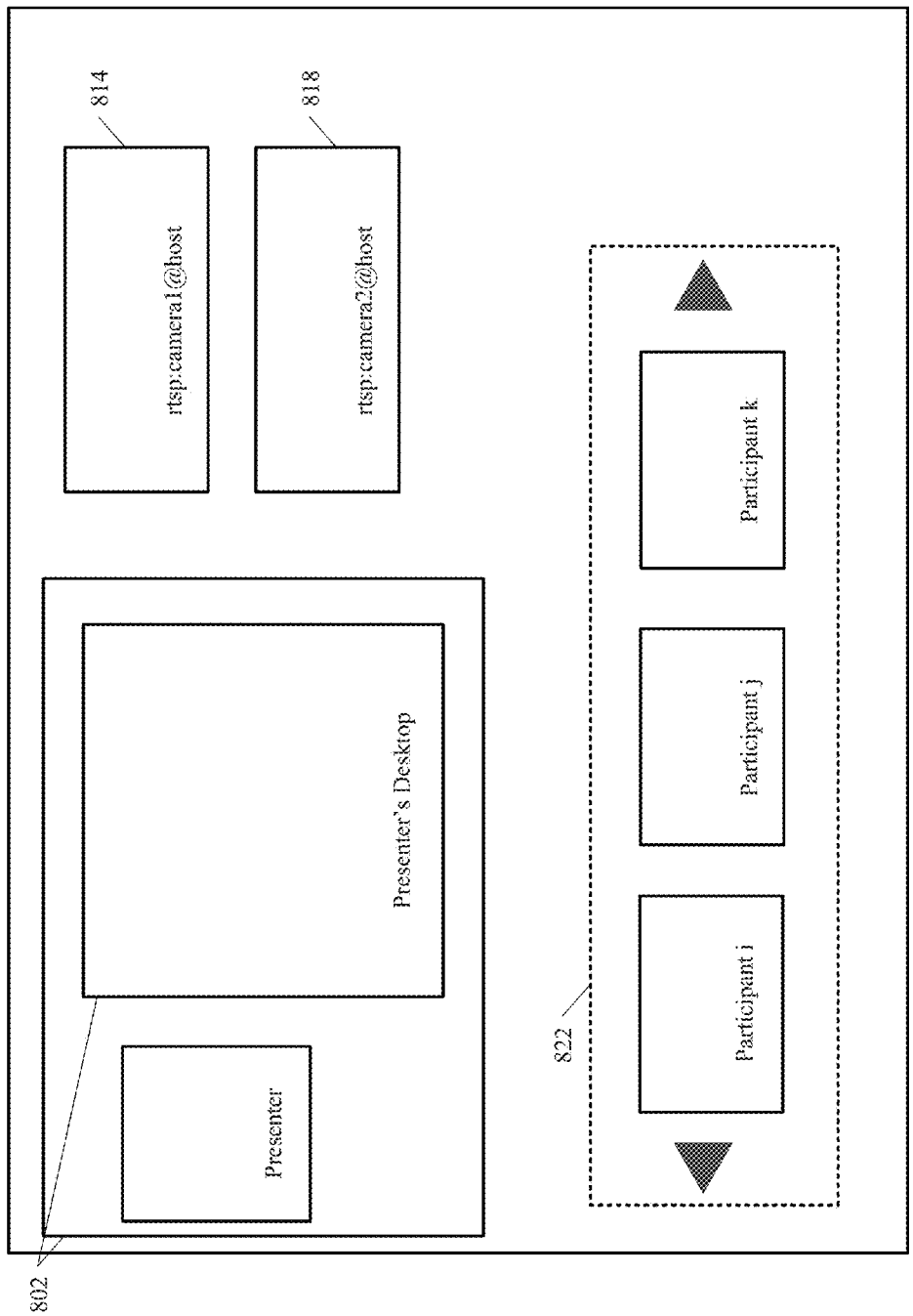
FIG. 8 is one implementation of a video interface template that controls visual arrangement of video broadcasts during a video conference using global scroll controls.

FIG. 8 is one implementation of a video interface template 800 that controls visual arrangement of video broadcasts during a video conference using global scroll controls 818 and 832. Global scroll controls 818 and 832 allow for navigation along end-to-end coordinates of the video interface template 800. In one implementation, the video interface template 800 specifies the default visual arrangement of video feeds from participants and remote participants, including visual arrangement of live streams from pseudo-participants. In some implementations, a designated visual arrangement can be saved for later user during scheduling of video conferences. Some implementations include the visual arrangement specifying a size and x-y coordinates of video feed windows of each participant and pseudo-participants. In one implementation the video interface template is generated using a GUI within the conferencing client at the time the video conference is scheduled by the user scheduling the conference. In another implementation permission to create conferencing templates is restricted (by role or specific user ID) and the user scheduling a conference is only allowed to select one of a set of pre-created templates.

In the example shown in FIG. 8, a presenter and the presenter's desktop are arranged on the upper left 802 of the video interface template 800 while the participants, occupy scrollable region 822 in the lower left and two pseudo-participants 814 and 818 are arranged on the right of the video interface template 800. In one implementation, the pseudo-participants automatically broadcast live video feeds into the designated windows arranged in the video interface template 800 upon its invocation. In another implementation, live video from a participant is associated with a horizontally scrollable region 822 in the video interface template 800 such that when the participant joints the video conference, his video feed is automatically and immediately streamed in a new window added within the defined scrollable region if there is room left within this region for an additional participant (if not, the newly joining participant's stream is shown only if the viewing user scrolls the view of this region enough to see the newly joined participant). In yet another implementation, the visual arrangement can be modified during a video conference for all the attendees or a subset of the attendees of the video conference. In some other implementations, the video interface template 800 includes horizontal and vertical scroll controls that facilitate easy navigation of the scrollable areas within the video interface template 800, particularly when the video interface template 800 is crowded with numerous video feeds windows of participants, and pseudo-participants. For instance, if multiple participants join the same video conference as new participants arrive additional participant windows are created in the scrollable region and if the current number of participants don't fit in the allocated space of the video interface template 800, then the region can be scrolled left or right using the arrows associated with the scrollable region 822. In other implementations the scrollable regions can be scrolled vertically.

In one implementation, the video interface template 800 can be stored and transmitted to participants joining the video conference using the following XML code that is explained in the code comments:

```
<xml>
    <source type="pseudo-participant" size="120×90">// specifying a first video source type and size of the window broadcasting video feed from the first video source.
        <position x="30" y="2"/>// specifying position of the window in video interface template.
        <url>rtsp:camera1 @host</url>// specifying a URL for accessing the first pseudo-participant video source.
    </source>
    <source type="pseudo-participant" size="120×90">// specifying a second video source type and size of the window broadcasting video feed from the second video source.
        <position x="140" y="2"/>// specifying position of the window in video interface template.
        <url>rtsp:camera2@host</url>// specifying a URL for accessing the second pseudo-participant video source.
    </source>
    <region type="horizontally scrollable" size="250×40">// specifying a horizontal scroll region and size of the corresponding horizontal scroll region.
        <position x="2" y="100"/>/>// specifying position of the horizontal scroll region in video interface template.
        <source type="participant" size="50×30"><position x="20" y="5"/>// specifying a first video source type, size of the window broadcasting video feed from the first video source, and specifying position of the window in video interface template.
        </source>
        <source type="participant" size="50×30"><position x="75" y="5"/>// specifying a second video source type, size of the window broadcasting video feed from the second video source, and specifying position of the window in video interface template.
        </source>
        <source type="participant" size="50×30"><position x="130" y="5"/>// specifying a third video source type, size of the window broadcasting video feed from the third video source, and specifying position of the window in video interface template.
        </source>>
        <source type="participant" size="50×30"><position x="185" y="5"/>// specifying a fourth video source type, size of the window broadcasting video feed from the fourth video source, and specifying position of the window in video interface template.
        </source>
    </region>
</xml>
```

Figure 9:
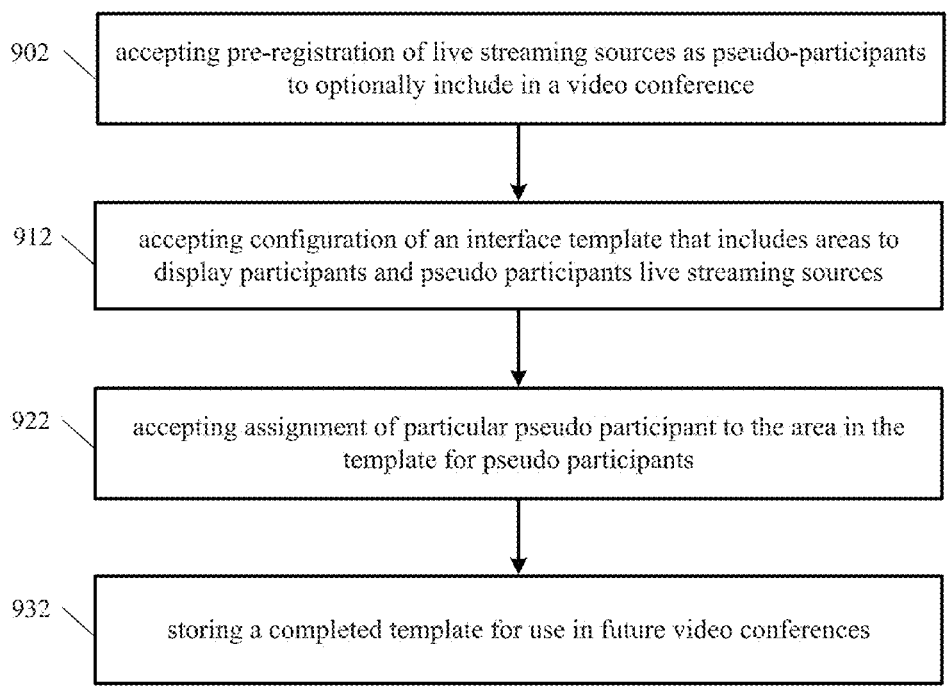
FIG. 9 shows one implementation of a method of controlling a video conferencing interface during a video conference.

FIG. 9 shows one implementation of a method 900 of controlling a video conferencing interface during a video conference. Flowchart 900 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 9. Multiple actions can be combined in some implementations. For convenience, this flowchart is described with reference to the system that carries out a method. The system is not necessarily part of the method.

At action 902, pre-registration is accepted by a server of live streaming sources as pseudo-participants to optionally include in a video conference. In one implementation, the pre-registration is accepted in response to at least speaking in a microphone, blinking of eye across an eye tracking device, moving a body part across a motion sensor, pressing a button on a device, selecting a screen object on an interface, or entering data across an interface. Examples of pseudo-participants include at least one of Internet Protocol (IP) cameras, desktop images, inputs from one or more mobile devices, and web windows.

At action 912, configuration of an interface template that includes areas to display participants and pseudo-participants live streaming sources is accepted. In one implementation, the interface template includes scroll controls that allow manipulation of the areas included for displaying participants and pseudo-participants live streaming sources. In some implementations, the scroll controls are used to horizontally navigate the scrollable region of the interface template. In other implementations, the scroll controls are used to vertically navigate the scrollable region of the interface template. In some other implementations, manipulation of the areas includes at least updating assignment of participants and pseudo-participants live streaming sources to the areas of the interface template during the video conference. In yet other implementations, manipulation of the areas includes modifying at least one of a position and size of the areas during the video conference.

At action 922, assignment of particular pseudo-participant to the area in the template for pseudo-participants is accepted. In some implementations, invoking the template instructs a video conferencing system to automatically bring a live streaming source represented by the particular pseudo-participant into the video conference At action 932, a completed template is stored in an on-demand database service for use in future video conferences. In some implementations, datastores can store the completed template into tables of a database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

This method and other implementations of the technology disclosed can include one or more of the following features and/or features described in connection with additional methods disclosed. Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Computer System

FIG. 10 is a block diagram of an example computer system 1000 to incorporate live streaming sources into a video conference. Computer system 1010 typically includes at least one processor 1014 that communicates with a number of peripheral devices via bus subsystem 1012. These peripheral devices can include a storage subsystem 1024 including, for example, memory devices and a file storage subsystem, user interface input devices 1022, user interface output devices 1020, and a network interface subsystem 1018. The input and output devices allow user interaction with computer system 1010. Network interface subsystem 1018 provides an interface to outside networks, including an interface to corresponding interface devices in other computer systems. Application server 1020 can be a framework that allows the applications of computer system 1000 to run, such as the hardware and/or software, e.g., the operating system.

User interface input devices 1022 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1010.

User interface output devices 1020 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1010 to the user or to another machine or computer system.

Storage subsystem 1024 stores programming and data constructs that provide the functionality of some or all of the modules and methods described herein. These software modules are generally executed by processor 1014 alone or in combination with other processors.

Memory 1026 used in the storage subsystem can include a number of memories including a main random access memory (RAM) 1030 for storage of instructions and data during program execution and a read only memory (ROM) 1032 in which fixed instructions are stored. A file storage subsystem 1018 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1028 in the storage subsystem 1024, or in other machines accessible by the processor.

Bus subsystem 1012 provides a mechanism for letting the various components and subsystems of computer system 1010 communicate with each other as intended. Although bus subsystem 1012 is shown schematically as a single bus, alternative implementations of the bus subsystem can use multiple busses.

Computer system 1010 can be of varying types including a workstation, server, computing cluster, blade server, server farm, or any other data processing system or computing device. Due to the ever-changing nature of computers and networks, the description of computer system 1010 depicted in FIG. 10 is intended only as one example. Many other configurations of computer system 1010 are possible having more or fewer components than the computer system depicted in FIG. 10.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A method of incorporating live streaming sources into a video conference, the method including:
    accepting pre-registration of live streaming sources as pseudo-participants to optionally include in a video conference;
    accepting selection of at least one pseudo-participant in the video conference;
    accepting instructions that control arrangement of the selected pseudo-participant among objects displayed in the video conference;
    causing the live streaming source represented by the pseudo-participant to be streamed to participants in the video conference without relay from one participant to another participant; and
    providing object-level security for a displayable source incorporated in the video conference by:
        maintaining at least one permissions list of the displayable source that identifies at least one of users, roles, and machines authorized to view streams from the displayable source; and
        checking responsiveness of an attendees list of the video conference against the permissions list.

2. The method of claim 1, wherein accepting instructions that control arrangement of the selected pseudo-participant further includes specifying a position of a stream window of the selected pseudo-participant in the video conference.

3. The method of claim 1, wherein accepting instructions that control arrangement of the selected pseudo-participant further includes specifying a size of a stream window of the selected pseudo-participant in the video conference.

4. The method of claim 1, further including providing a menu of the registered pseudo-participants that can be included in the video conference.

5. The method of claim 1, wherein the video conference includes simultaneous streaming of a plurality of displayable sources, further including:
    blanking out streams of some displayable sources that an attendee is not authorized to view without blanking out streams of other displayable sources that the attendee is authorized to view.

6. The method of claim 1, further including peercasting streams from the live streaming sources registered as pseudo-participants directly to participants in the video conference.

7. The method of claim 1, wherein the pseudo-participants are at least one of:
    one or more Internet Protocol (IP) cameras;
    one or more desktop images;
    inputs from one or more mobile devices; and
    one or more web windows.

8. The method of claim 1, further including basing distinction between pseudo-pseudo-participants and participants on different address formats for invitee pseudo-participants and participants.

9. A method of incorporating live streaming sources into a video conference, the method including:
    pre-registering live streaming sources as pseudo-participants to optionally include in a video conference;
    selecting at least one pseudo-participant in the video conference;
    providing instructions that control at least positioning of the selected pseudo-participant among objects displayed in the video conference; and
    receiving a stream from the live streaming source represented by the pseudo-participant without relay from one participant to another participants;
    wherein the video conference includes simultaneous streaming of a plurality of displayable sources, further including:
        receiving blanked out streams of some displayable sources not authorized to view without receiving blanked out streams of other displayable sources authorized to view.

10. The method of claim 9, wherein providing instructions that control arrangement of the selected pseudo-participant further includes specifying a position of a stream window of the selected pseudo-participant in the video conference.

11. The method of claim 9, wherein providing instructions that control arrangement of the selected pseudo-participant further includes specifying a size of a stream window of the selected pseudo-participant in the video conference.

12. The method of claim 9, further including selecting from a menu of the registered pseudo-participants that can be included in the video conference.

13. The method of claim 9, further including receiving streams, from the live streaming sources registered as pseudo-participants, peercasted directly to participants in the video conference.

14. A method of controlling a video conferencing interface, the method including:
    accepting pre-registration of live streaming sources as pseudo-participants to optionally include in a video conference;
    accepting configuration of an interface template that includes areas to display participants and pseudo-participants live streaming sources;
    accepting assignment of a particular pseudo-participant to the area in the template for pseudo-participants, such that invoking the template instructs a video conferencing system to automatically bring a live streaming source represented by the particular pseudo-participant into the video conference; and
    storing a completed template for use in future video conferences.

15. The method of claim 14, wherein the interface template further includes scroll controls that allow manipulation of the areas included to display participants and pseudo-participants live streaming sources.

16. The method of claim 15, further including using the scroll controls to horizontally navigate a scrollable region of the interface template.

17. The method of claim 15, further including using the scroll controls to vertically navigate a scrollable region of the interface template.

18. The method of claim 15, wherein manipulation of the areas further includes at least updating assignment of participants and pseudo-participants live streaming sources to the areas of the interface template during the video conference.

19. The method of claim 15, wherein manipulation of the areas further includes modifying at least one of a position and size of the areas during the video conference.

20. The method of claim 14, further including accepting instructions to modify the interface template during the video conference, wherein modifying the interface template includes defining new areas to incorporate new participants and pseudo-participants live streaming sources for display during the video conference.

\* \* \* \* \*